(12) United States Patent
Nagatomi et al.

(10) Patent No.: US 11,027,639 B2
(45) Date of Patent: Jun. 8, 2021

(54) AUTOMOBILE

(71) Applicant: Toyota Jidosha Kabushiki Kaisha, Toyota (JP)

(72) Inventors: Keiko Nagatomi, Toyota (JP); Noritaka Toyama, Anjo (JP); Atsuko Kobayashi, Nagoya (JP); Keisuke Ito, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 16/272,336

(22) Filed: Feb. 11, 2019

(65) Prior Publication Data

US 2019/0248263 A1 Aug. 15, 2019

(30) Foreign Application Priority Data

Feb. 15, 2018 (JP) .............................. JP2018-025377

(51) Int. Cl.
| | | |
|---|---|---|
| *A47B 23/00* | (2006.01) | |
| *B60N 3/00* | (2006.01) | |
| *B62D 25/06* | (2006.01) | |
| *A47B 5/04* | (2006.01) | |
| *A47B 5/00* | (2006.01) | |
| *B60N 2/06* | (2006.01) | |

(52) U.S. Cl.
CPC .............. *B60N 3/001* (2013.01); *A47B 5/006* (2013.01); *A47B 5/04* (2013.01); *B60N 2/067* (2013.01); *B62D 25/06* (2013.01); *A47B 2005/003* (2013.01)

(58) Field of Classification Search
CPC ..... A47B 5/04; A47B 5/006; A47B 2005/003; B60N 2/067; B60N 3/001; B62D 25/06
See application file for complete search history.

(56) References Cited

U.S. PATENT DOCUMENTS

| | | | | |
|---|---|---|---|---|
| 2,580,980 A | * | 1/1952 | Vrooman | A47B 13/023 108/42 |
| 2,827,350 A | * | 3/1958 | Galloway | A47B 13/023 108/147 |
| 2,830,707 A | * | 4/1958 | Schmidt | A47B 13/00 211/113 |
| 5,370,060 A | * | 12/1994 | Wang | B60N 3/004 108/149 |
| 7,445,188 B2 | * | 11/2008 | Lamparter | B60R 5/003 108/149 |
| 7,658,153 B1 | * | 2/2010 | Patoka | B60R 11/00 108/44 |
| 2007/0086200 A1 | * | 4/2007 | Togura | H03K 17/962 362/459 |

(Continued)

FOREIGN PATENT DOCUMENTS

| | | |
|---|---|---|
| CN | 205573701 U | 9/2016 |
| JP | S50-011230 U | 2/1975 |

(Continued)

*Primary Examiner* — Matthew W Ing
(74) *Attorney, Agent, or Firm* — Dinsmore & Shohl LLP

(57) ABSTRACT

An automobile, includes: a table stowed at a ceiling of a vehicle cabin; and a table raising and lowering apparatus configured to, resulting from a predetermined operation, raise and lower the table between a usage position at a seat front side of a vehicle occupant seated on a vehicle seat and a stowage position at which the table is stowed at the ceiling.

20 Claims, 13 Drawing Sheets

(56) References Cited

U.S. PATENT DOCUMENTS

| | | |
|---|---|---|
| 2011/0141057 A1 | 6/2011 | Sizelove |
| 2014/0054430 A1* | 2/2014 | Jacobson ............. F16M 11/041 |
| | | 248/295.11 |
| 2016/0375811 A1 | 12/2016 | Bendewald et al. |
| 2017/0021741 A1* | 1/2017 | Kanehira ............... B60N 2/067 |
| 2017/0057542 A1* | 3/2017 | Kim ........................ B62D 1/28 |

FOREIGN PATENT DOCUMENTS

| | | |
|---|---|---|
| JP | H09-175245 A | 7/1997 |
| JP | 2013-506593 A | 2/2013 |
| JP | 2017-514735 A | 6/2017 |

* cited by examiner

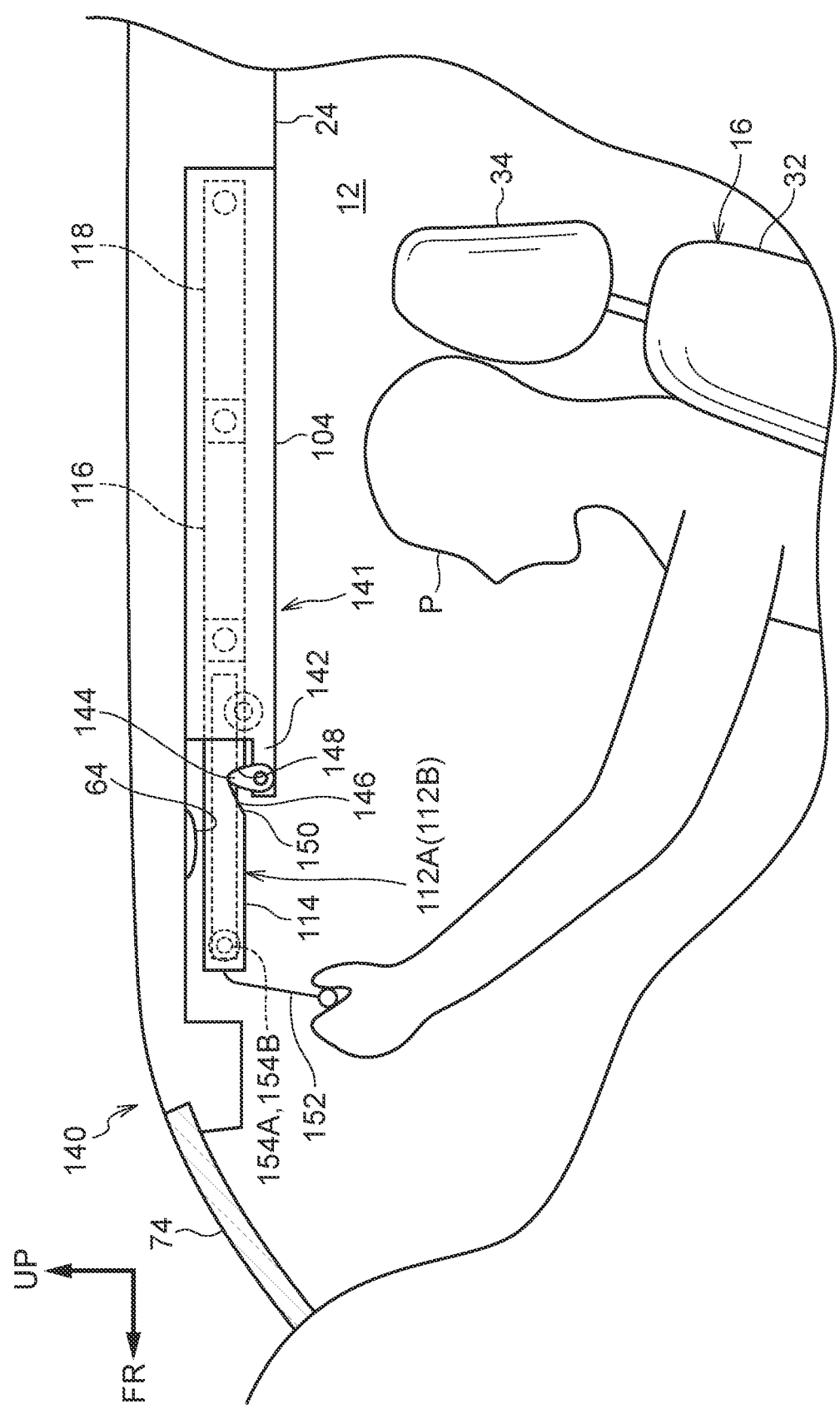

AUTOMOBILE

CROSS-REFERENCE TO RELATED APPLICATION

This application claims priority under 35 USC 119 from Japanese Patent Application No. 2018-25377 filed Feb. 15, 2018, the disclosure of which is incorporated by reference herein in its entirety.

BACKGROUND

Technical Field

The present disclosure relates to an automobile.

Related Art

There have been calls requesting a table in front of a seated vehicle occupant when a vehicle is parked, when a vehicle, which is capable of autonomous driving, is driving fully autonomously, and the like.

There is demand to lay out and write on documents and suchlike on this table, and to eat food from the table.

Japanese Patent Application Laid-Open (JP-A) No. H9-175245 proposes installing a table between a front seat and a rear seat by fitting one end of a stand to bosses formed on a floor surface and fitting another end of the stand to bosses formed at a lower face of the table.

SUMMARY

However, this conventional technology requires an assembly operation for installing the table, which is complicated.

In consideration of the circumstances described above, an object of the present disclosure is to provide an automobile in which a table can be installed in front of a seated occupant easily.

An automobile according to a first aspect of the present disclosure includes: a table stowed at a ceiling of a vehicle cabin; and a table raising and lowering apparatus configured to, resulting from a predetermined operation, raise and lower the table between a usage position at a seat front side of a vehicle occupant seated on a vehicle seat and a stowage position at which the table is stowed at the ceiling.

According to the automobile with this structure, in response to a predetermined operation by a vehicle occupant, the table is lowered by the table raising and lowering apparatus from the stowage position at which the table is stowed in the ceiling of the vehicle cabin to the usage position at the seat front side of the seated vehicle occupant. That is, when the seated vehicle occupant wishes to use the table, the table may be easily installed at the seat front of the vehicle occupant just by the vehicle occupant performing the predetermined operation. When the vehicle occupant no longer wishes to use the table, the table is stowed at the ceiling of the vehicle cabin and is not an impediment for the vehicle occupant.

The meaning of the term "table stowed at a ceiling" as used herein is intended to include, in addition to the table being accommodated inside a ceiling, the table being accommodated in a recess portion provided at a ceiling or the table being arranged over a ceiling surface.

In an automobile according to a second aspect of the present disclosure, the first aspect further includes an operation apparatus that causes driving of the table raising and lowering apparatus, wherein the table raising and lowering apparatus is driven and the table is raised or lowered consequent to the operation apparatus being operated.

According to the automobile with this structure, the table raising and lowering apparatus is driven by the vehicle occupant simply operating the operation apparatus, and thus the table moves automatically from the stowage position to the usage position. When the table is stowed too, the table raising and lowering apparatus is driven by the vehicle occupant simply operating the operation apparatus, and thus the table moves automatically from the usage position to the stowage position. Thus, installation and stowing of the table are even easier.

In an automobile according to a third aspect of the present disclosure, the second aspect further includes a seat movement apparatus that moves the vehicle seat in a seat front-rear direction, wherein, when the operation apparatus is operated, the seat movement apparatus moves the vehicle seat toward a seat rear before the table raising and lowering apparatus lowers the table from the stowage position to the usage position.

According to the automobile with this structure, when the table raising and lowering apparatus is driven by the operation apparatus and the table is lowered from the stowage position to the usage position, the seat movement apparatus moves the seat to the seat rear prior to the lowering of the table.

Thus, a space at a seat front of the vehicle occupant sitting on the vehicle seat is widened, the table lowering operation is made easier, and convenience during usage of the table is improved. In particular, if the vehicle seat is a driver seat, a steering wheel is disposed at the seat front of the vehicle seat and a space at the seat front of the driver seat is narrow; because the vehicle seat is moved to the seat rear at a time of usage of the table, the table lowering operation is easier and convenience during usage of the table is improved.

In an automobile according to a fourth aspect of the present disclosure, in the third aspect, after the table raising and lowering apparatus raises the table from the usage position to the stowage position, the seat movement apparatus moves the vehicle seat to an original position at a seat front side, the original position being a position of the vehicle seat prior to the operation of the operation apparatus for lowering of the table.

According to the automobile with this structure, after the table has been moved from the usage position to the stowage position, the vehicle seat that has been moved to the seat rear side at a time of usage of the table is moved by the seat movement apparatus to the original position at the seat front side, at which the vehicle seat was disposed before usage of the table. Therefore, there is no need for the vehicle seat to be manually moved to the original position at a time of stowing of the table. Thus, convenience is excellent.

In an automobile according to a fifth aspect of the present disclosure, in any one of the first to fourth aspects, the vehicle seat is a vehicle seat for a driver.

In the automobile with this structure, because a steering wheel is disposed at the seat front of the vehicle seat for a driver, the table must be moved from the usage position to the stowage position when the steering wheel is to be operated (the vehicle occupant is to drive).

In this automobile, the table may be raised from the usage position to the stowage position by the table raising and lowering apparatus in response to an operation by the vehicle occupant. That is, the table may be quickly moved from the seat front of the driver toward the ceiling side, and the vehicle occupant who is a driver may operate the steering wheel.

In an automobile according to a sixth aspect of the present disclosure, in the fifth aspect, the automobile is capable of autonomous driving, and the table can be lowered from the stowage position to the usage position only when the automobile is halted or during fully autonomous driving.

According to the automobile with this structure, if the table were lowered from the stowage position to the usage position at the seat front of the vehicle occupant while a driver is operating the steering wheel (driving), there would be a risk of the table impeding driving by the vehicle occupant. Therefore, lowering of the table from the stowage position to the usage position is enabled only when the automobile is parked or during fully autonomous driving. Thus, while the vehicle occupant is driving, the table is prevented from descending and impeding driving.

The meaning of the term "fully autonomous driving" as used in the present disclosure is intended to include an autonomous driving state in which there is no need for a vehicle occupant to conduct driving operations.

In an automobile according to a seventh aspect of the present disclosure, in the fifth aspect or the sixth aspect, the automobile is capable of autonomous driving; and when the table is at the usage position, switching to a driving mode other than a fully autonomous driving mode is prohibited.

According to the automobile with this structure, when the table is at the usage position for the driver seat, switching into any driving mode other than a fully autonomous driving mode is prohibited. Thus, the vehicle occupant who is a driver is prevented from operating the steering wheel (driving) when the table is disposed at the usage position, which is to say, between the vehicle occupant and the steering wheel at the seat front thereof.

In an automobile according to an eighth aspect of the present disclosure, in any one of the first to seventh aspects, a spot lamp configured to illuminate the table when the table is at the usage position is provided at the ceiling, the spot lamp being disposed at the vehicle upper side of the table when the table is at the stowage position.

In the automobile with this structure, because the spot lamp configured to illuminate the table at the usage position is provided, a book or the like may be placed on the table during usage of the table and read under the illumination of the spot lamp even at night. Because the spot lamp is disposed at the ceiling at the vehicle upper side of the table at the stowage position, the spot lamp cannot be seen from inside the vehicle cabin when the table is stowed, which is excellent for visual design.

In an automobile according to a ninth aspect of the present disclosure, in the eighth aspect, the spot lamp automatically turns on when the table is lowered by the table raising and lowering apparatus.

In the automobile with this structure, the spot lamp automatically turns on when the table is lowered by the table raising and lowering apparatus and reaches the usage position. That is, an operation to turn on the spot lamp at a time of usage of the table is not required, which improves convenience.

With the structures described above, in automobiles according to the first to fifth aspects, the table is easily installed at the seat front of a seated vehicle occupant.

With the structures described above, automobiles according to the sixth and seventh aspects further improve running safety.

With the structures described above, automobiles according to the eighth and ninth aspects improve convenience at times of usage of the table.

BRIEF DESCRIPTION OF DRAWINGS

Embodiments will be described in detail based on the following figures, wherein:

FIG. 13 is a side sectional diagram viewing a driver seat side in an automobile according to a second variation of the second exemplary embodiment, in which the automobile is sectioned at the vehicle width direction middle, and the diagram showing the table stowed state.

DETAILED DESCRIPTION

First Exemplary Embodiment

Figure 1:
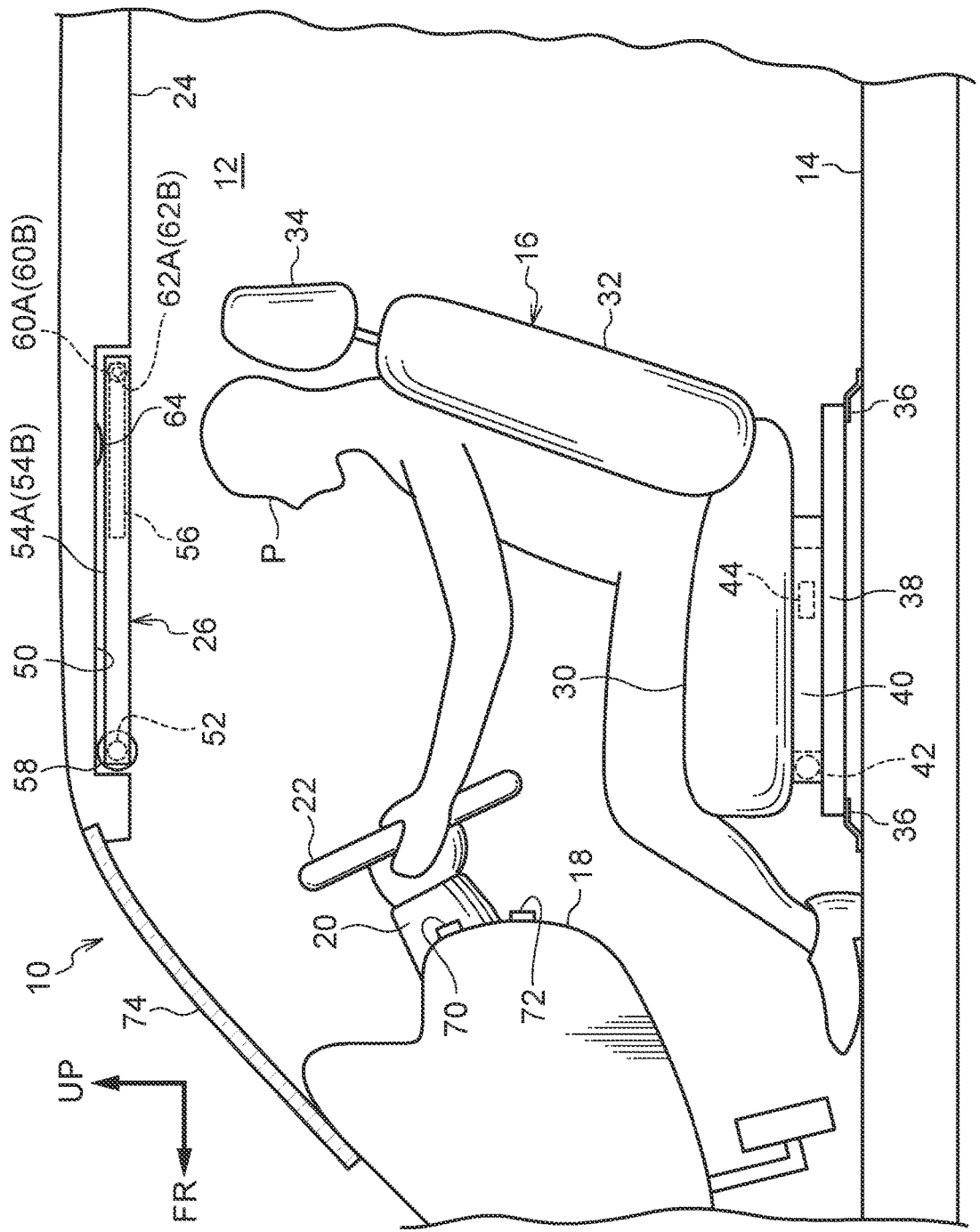
FIG. 1 is a side sectional diagram viewing a driver seat side in an automobile according to a first exemplary embodiment, in which the automobile is sectioned at a vehicle width direction middle, and the diagram showing a table stowed state.

An automobile according to a first exemplary embodiment of the present disclosure is described with reference to FIG. 1 to FIG. 8. The drawings are schematic drawings; parts that have little relationship with the present disclosure are not shown in the drawings. In the drawings, the arrow FR indicates a vehicle front, the arrow UP indicates a vehicle upper side, and the arrow W indicates a vehicle width direction. In the drawings, a seat front, seat upper side and seat width direction match, respectively, the vehicle front, vehicle upper side and vehicle width direction, and are therefore referred to in common as the "vehicle front", "vehicle upper side" and "vehicle width direction".

Structures

As shown in FIG. 1, an automobile 10 according to the present exemplary embodiment is equipped with a vehicle seat 16, a steering wheel 22 and a table opening apparatus 26. The vehicle seat 16 is disposed at an upper portion of a floor 14 of a vehicle cabin 12. The steering wheel 22 is disposed at a distal end of a steering column 20, which is disposed to project to the vehicle rear side from a dashboard 18. The table opening apparatus 26 is provided at the vehicle front side of a ceiling 24 structuring the vehicle cabin 12.

The vehicle seat 16 includes a seat cushion 30 that supports the buttock area of a vehicle occupant P, a seat back 32 that supports the back area of the vehicle occupant P, and a headrest 34 that supports the head area of the vehicle occupant P.

Seat rail upper members 40 of the vehicle seat 16 are disposed to be slidable in the vehicle front-and-rear (seat front-and-rear) direction relative to a pair of seat rail lower members 38, which are supported at the upper portion of the floor 14 via support members 36. The seat cushion 30 is disposed on the seat rail upper members 40. Thus, the vehicle seat 16 is slidable in the vehicle front-and-rear direction on the seat rail lower members 38.

A seat sliding motor 42 is provided at the seat rail upper members 40 of the vehicle seat 16. The seat sliding motor 42 is driven by control signals from a control section 80, which is described below, as a result of which the vehicle seat 16 may slide in the vehicle front-and-rear direction on the seat rail lower members 38.

A seat position detection sensor 44 is provided at the seat rail upper members 40 and detects a vehicle front-and-rear direction position of the vehicle seat 16.

As shown in FIG. 1, in a table stowed state, the table opening apparatus 26 is stowed in a recess portion 50 provided at the ceiling 24 above a driver seat. The table opening apparatus 26 includes a turning axle 52, a pair of support rods 54A and 54B, and a substantially rectangular table 56. The turning axle 52 is provided at a vehicle front side end portion of the recess portion 50 and extends in the vehicle width direction. The support rods 54A and 54B extend to the vehicle rear side from both of vehicle width direction end portions of the turning axle 52. The table 56 is disposed between the pair of support rods 54A and 54B.

A table raising and lowering motor 58 is provided at a vehicle width direction end portion of the turning axle 52. The pair of support rods 54A and 54B can be turned through 90° in a vehicle side view by driving of the table raising and lowering motor 58 (see FIG. 3).

The table 56 is attached (see FIG. 4) to rotary axles 62A and 62B of a pair of opening motors 60A and 60B, which are provided at vehicle rear side end portions of the support rods 54A and 54B. The table 56 is supported to be turnable, by driving of the opening motors 60A and 60B, through 90° about the rotary axles 62A and 62B relative to the support rods 54A and 54B in the vehicle side view (see FIG. 3).

Thus, by driving of the opening motors 60A and 60B, the table 56 can be opened to a state that is turned 90° clockwise in the vehicle side view (see the direction of arrow B1 in FIG. 3) from a state of being parallel with the support rods 54A and 54B.

Figure 3:
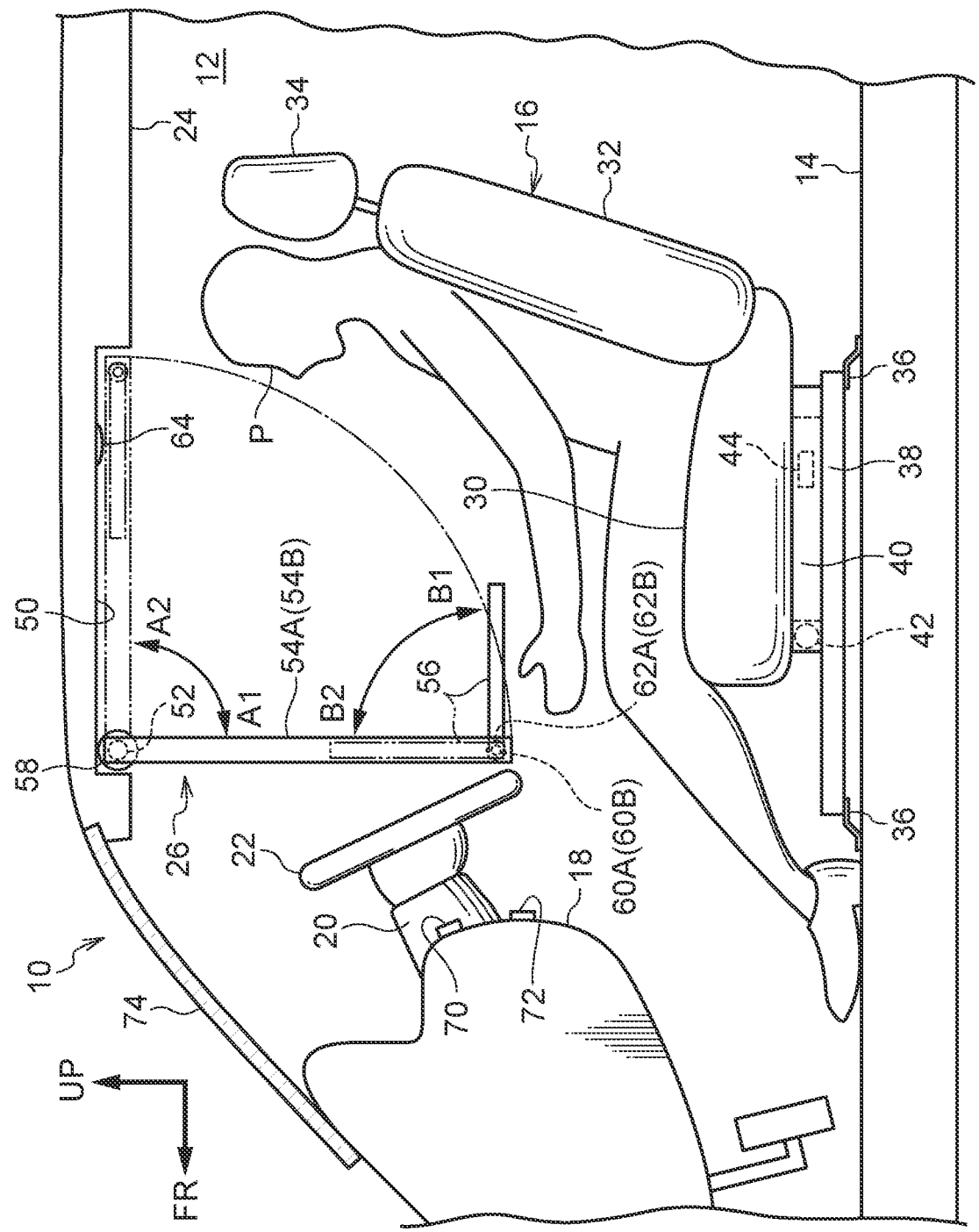
FIG. 3 is a side sectional diagram viewing the driver seat side in the automobile according to the first exemplary embodiment, in which the automobile is sectioned at the vehicle width direction middle, and the diagram showing a table open state.

A state in which the table 56 is opened and can be used by the vehicle occupant P as shown in FIG. 3 is referred to as "the open (usage) state" and "when the table is open (in use)". The state in which the table 56 is stowed in the recess portion 50 is referred to as "the stowed state" and "when the table is stowed".

As shown in FIG. 1, a spot lamp 64 is disposed at the recess portion 50 provided at the ceiling 24. When the table is stowed, the spot lamp 64 is covered by the table 56 and viewing from outside is prevented. When the table is open (see FIG. 3), the top of the table 56 is illuminated by the spot lamp 64 being lit.

A table use button 70 and a lamp lighting button 72 are provided at the dashboard 18 disposed at the vehicle front of the driver seat. The table use button 70 causes driving of the table opening apparatus 26 to open or stow the table 56. The lamp lighting button 72 causes lighting or extinguishing of the spot lamp 64. When the table use button 70 is pressed once, the table use button 70 outputs table opening signals to the control section 80 that is described below. When the table use button 70 is pressed once again, the table use button 70 outputs table stowing signals to the control section 80. Similarly, when the lamp lighting button 72 is pressed once, the lamp lighting button 72 outputs spot lamp lighting signals to the control section 80. When the lamp lighting button 72 is pressed once again, the lamp lighting button 72 outputs lamp extinguishing signals to the control section 80.

A front windshield glass 74 is disposed between the upper end of the dashboard 18 and a vehicle front side end portion of the ceiling 24.

Figure 5:
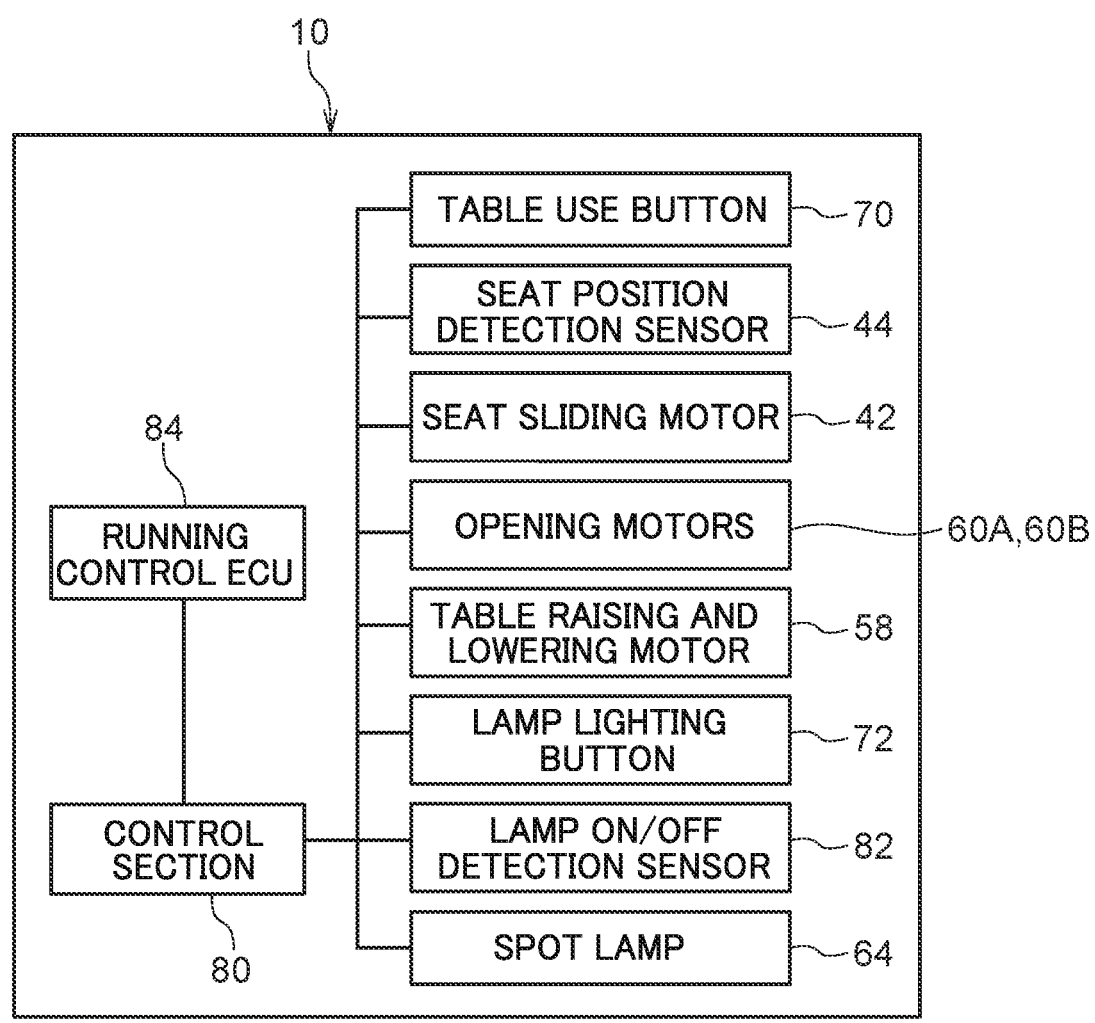
FIG. 5 is a block diagram relating to table opening and stowing in the automobile according to the first exemplary embodiment.

As depicted in FIG. 5, the automobile 10 is equipped with the control section 80 that controls the vehicle seat 16 and table opening apparatus 26 and controls the table 56 to enable switching between the stowed state and the open state. The control section 80 includes an electronic control unit (ECU) featuring a CPU, ROM, RAM and so forth.

In response to inputs of operation signals from the table use button 70, the control section 80 implements opening and stowing of the table 56 by checking detection signals from the seat position detection sensor 44 and outputting driving signals to the seat sliding motor 42, the table raising and lowering motor 58 and the opening motors 60A and 60B.

In response to inputs of operation signals from the lamp lighting button 72, the control section 80 checks detection signals from a lamp on/off detection sensor 82 and implements lighting and extinguishing of the spot lamp 64. The lamp on/off detection sensor 82 is a sensor that detects lighting and extinguishing of the spot lamp 64.

A running control ECU 84 controls running states of the automobile 10, which is capable of autonomous driving. The running control ECU 84 controls switching of shift lever positions and controls switching of driving modes. On the basis of detection signals from the running control ECU 84, the control section 80 checks whether the automobile 10 is halted, driving modes of the automobile 10 and the like. The control section 80 also outputs control signals to the running control ECU 84 and restricts switching of the shift lever position, the driving mode and the like.

Operation

Operational effects of the automobile 10 structured in this manner are described with reference to the flowcharts shown in FIG. 6 and FIG. 7. A situation in which the vehicle seat 16 is a driver seat is described below.

Figure 6:
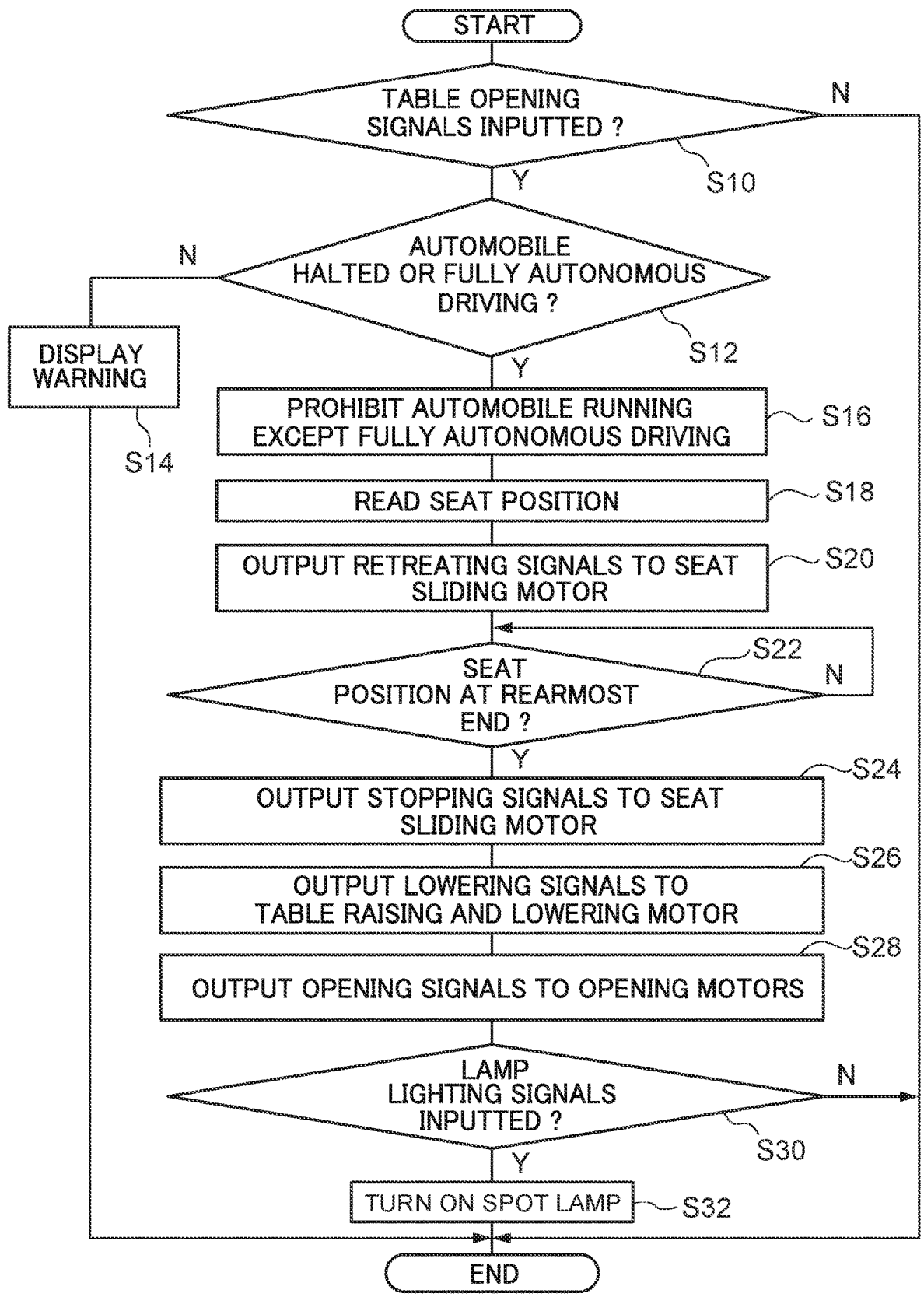
FIG. 6 is a flowchart showing a table opening procedure in the automobile according to the first exemplary embodiment.
Figure 7:
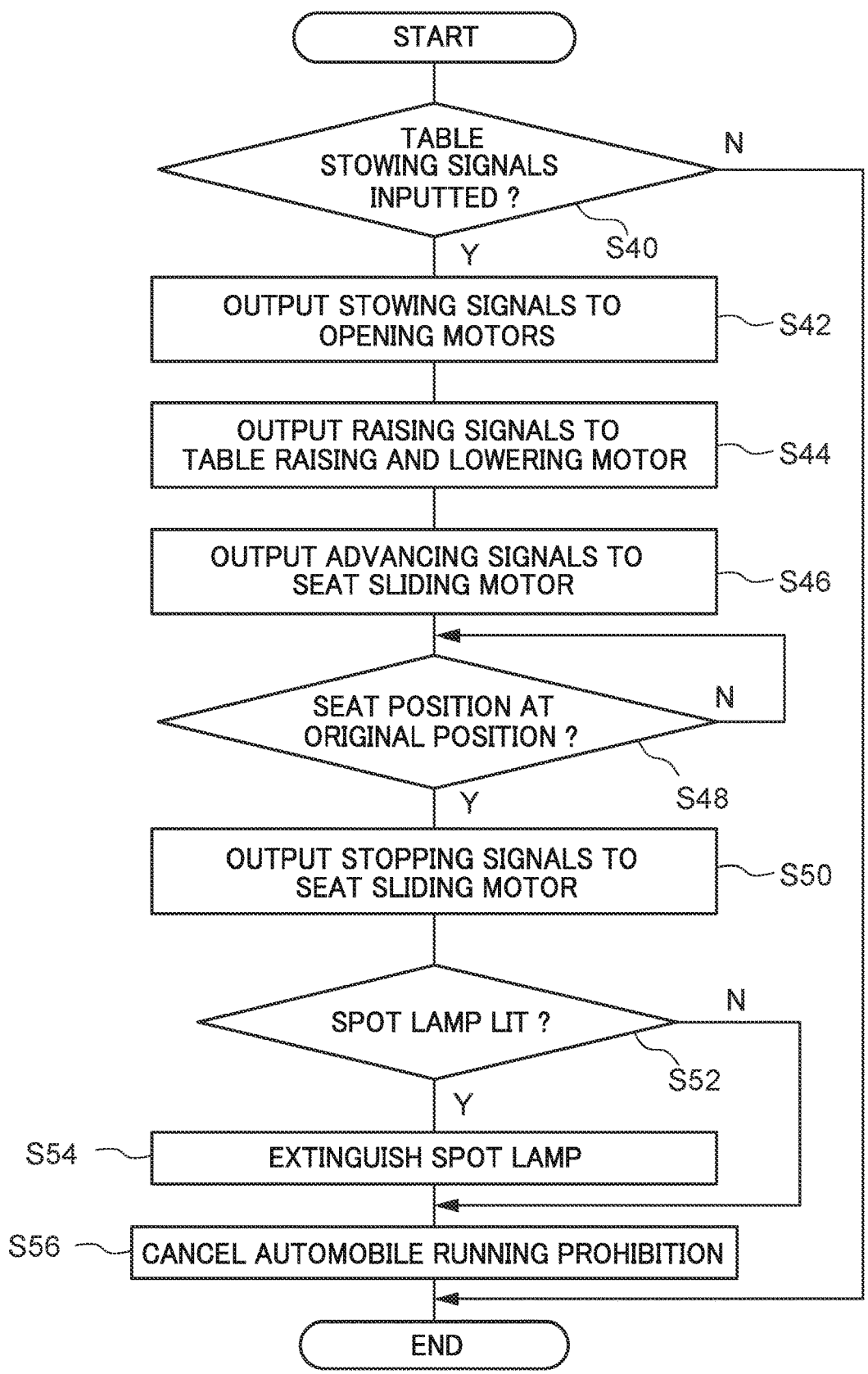
FIG. 7 is a flowchart showing a table stowing procedure in the automobile according to the first exemplary embodiment.

When a vehicle occupant P presses the table use button 70, table opening signals are inputted to the control section 80 (step S10 in FIG. 6). Note that FIG. 6 is omitted in the following descriptions).

When the table opening signals are inputted ("YES" in step S10), the control section 80 makes a determination (step S12) on the basis of input signals from the running control ECU 84 as to whether the automobile 10 is halted (the shift lever is in a neutral position or a parking position) or is in a fully autonomous driving mode.

The meaning of the term "fully autonomous driving mode" as used herein is intended to include driving modes that implement autonomous driving without requiring any driving operations by a vehicle occupant at all.

If the automobile 10 is running in a mode other than a fully autonomous driving mode ("NO" in step S12), the control section 80 does not open the table 56 but implements a warning display (step S14) warning the vehicle occupant P that the table cannot be opened. This is because driving by the vehicle occupant P (operation of the steering wheel 22) might be hindered if the table 56 were opened. For example the control section 80 may turn on an indicator lamp.

On the other hand, if the automobile 10 is halted or the automobile 10 is in a fully autonomous driving mode ("YES" in step S12), the control section 80 outputs switching prohibition signals to the running control ECU 84 (step S16), prohibiting switching into a driving mode other than a fully autonomous driving mode. Hence, switching from the current state of the automobile 10 to a driving mode other than the fully autonomous driving mode is prohibited.

Next, on the basis of detection signals from the seat position detection sensor 44, the control section 80 detects and temporarily memorizes (step S18) a vehicle front-and-rear direction position of the vehicle seat 16 (below referred to as "the original position").

Unless the position of the vehicle seat 16 is at a rearmost end, the control section 80 outputs retreating signals to the seat sliding motor 42 (step S20). Accordingly, the seat sliding motor 42 is driven and the vehicle seat 16 moves toward the vehicle rear side on the seat rail lower members 38.

Figure 2:
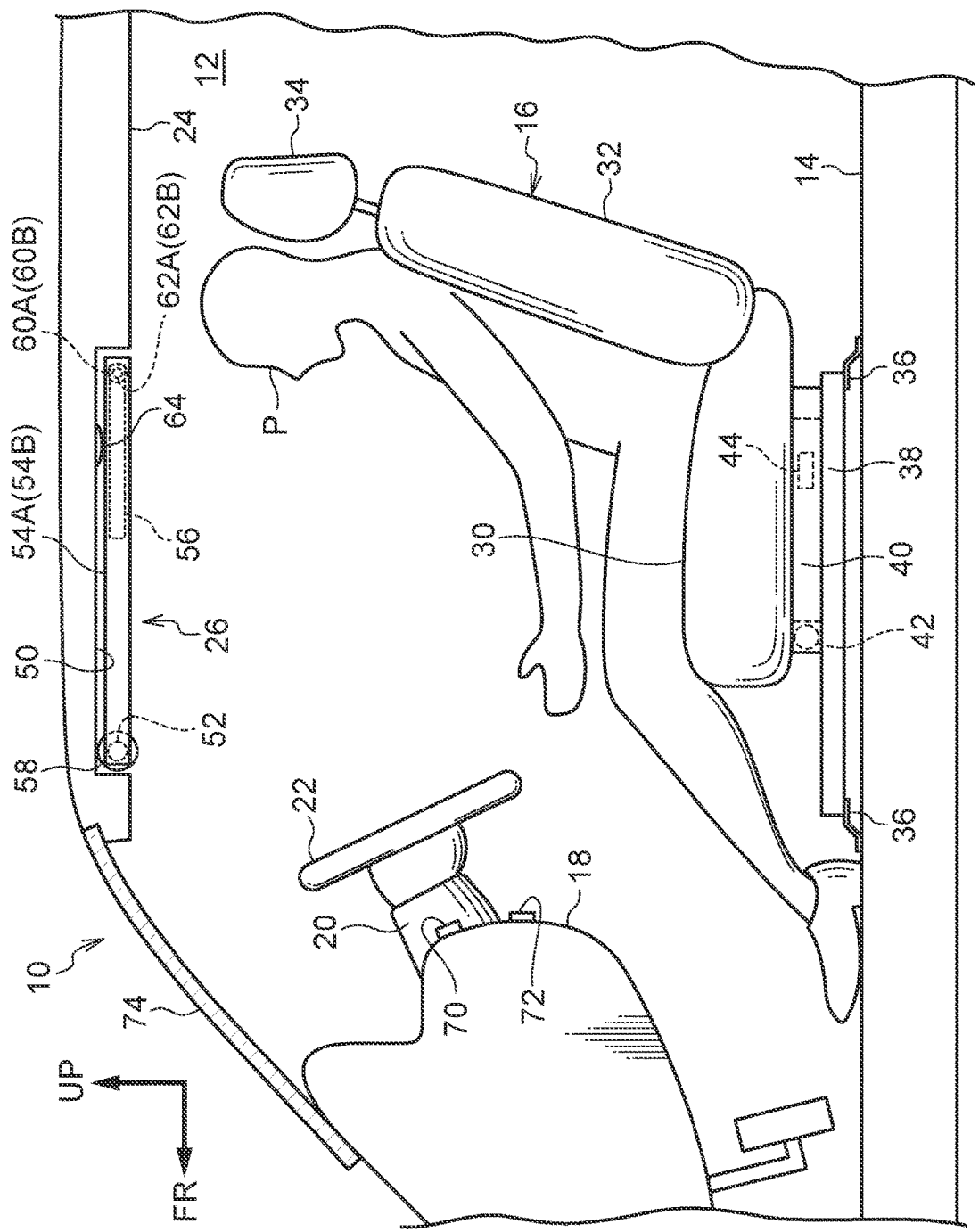
FIG. 2 is a side sectional diagram viewing the driver seat side in the automobile according to the first exemplary embodiment, in which the automobile is sectioned at the vehicle width direction middle, and the diagram showing a table opening intermediate state or a table stowing intermediate state.

When the control section 80 confirms, on the basis of detection signals from the seat position detection sensor 44, that the vehicle seat 16 has reached the rearmost end position, the control section 80 outputs stopping signals to the seat sliding motor 42 ("YES" in step S22; step S24). Thus, as shown in FIG. 2, the vehicle seat 16 is moved on the seat rail lower members 38 to the rearmost end position.

If the initial position of the vehicle seat 16 is at the rearmost end position, the processing of steps S20 to S24 is omitted.

Figure 4:
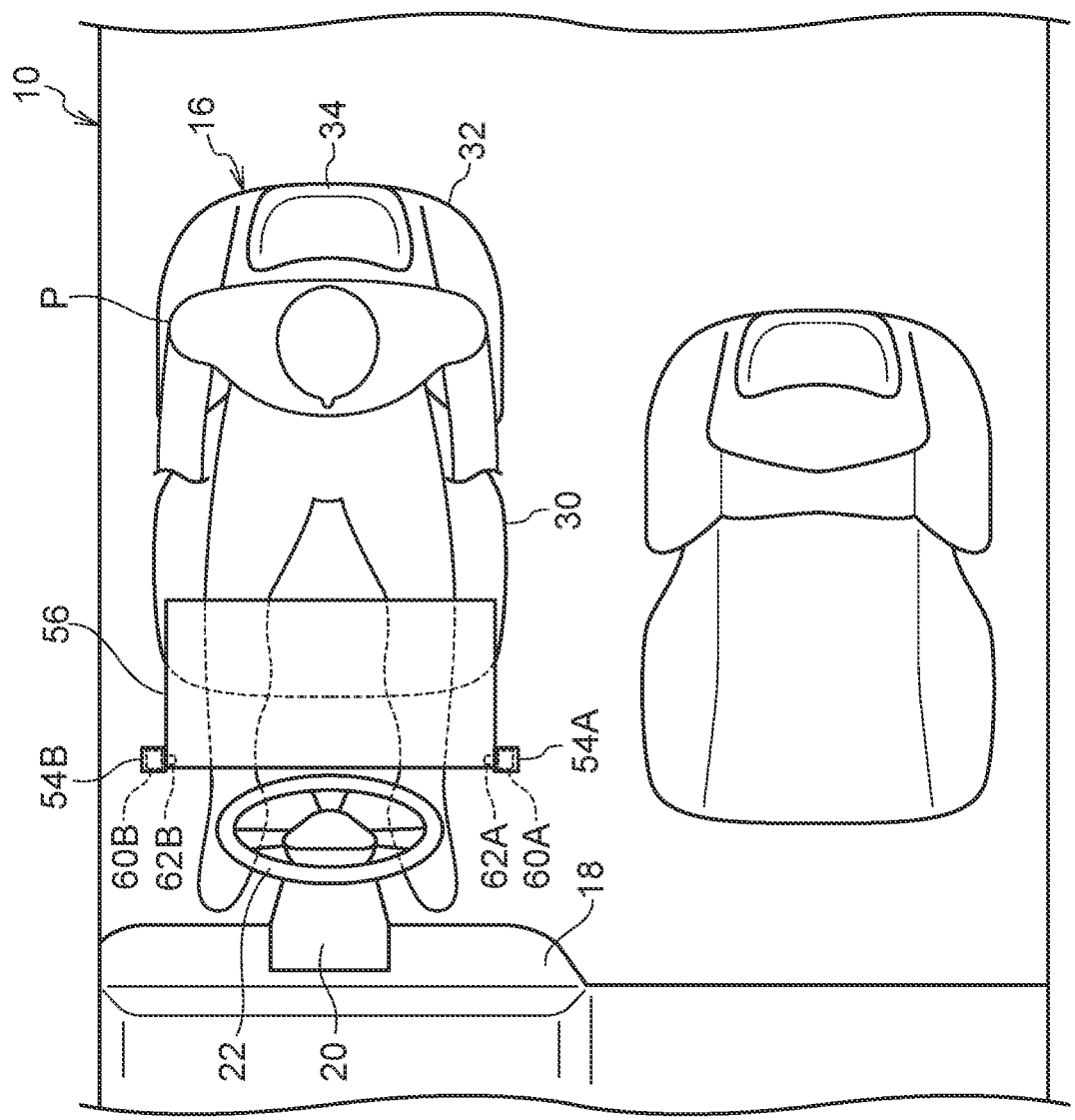
FIG. 4 is a plan diagram viewing a vehicle cabin interior of the automobile according to the first exemplary embodiment, which is a diagram showing the table open state.

Next, the control section 80 outputs lowering signals to the table raising and lowering motor 58 (step S26). Accordingly, the table raising and lowering motor 58 is driven and the pair of support rods 54A and 54B are turned 90° in the clockwise direction of FIG. 3 (see arrow A1 in FIG. 3). As a result, as shown in FIG. 3 and FIG. 4, the pair of support rods 54A and 54B extend vertically downward from the ceiling 24 just at the vehicle rear side of the steering wheel 22.

The table 56 turns together with this turning of the support rods 54A and 54B. As a result, the spot lamp 64 that was covered by the table 56 is exposed to the vehicle cabin side thereof (see FIG. 3).

The control section 80 also outputs opening signals to the opening motors 60A and 60B (step S28). Accordingly, the opening motors 60A and 60B are driven and the table 56 is turned 90° in the clockwise direction of FIG. 2 (see arrow B1 in FIG. 3). As a result, in the vehicle side view, the table 56 is arranged toward the vehicle rear side from the distal ends (lower ends) of the pair of support rods 54A and 54B.

Next, if lamp lighting signals have been inputted to the control section 80 due to the lamp lighting button 72 being pressed by a vehicle occupant ("YES" in step S30), the control section 80 turns on the spot lamp 64 (step S32). If no lamp lighting signals have been inputted, the control section 80 just ends this processing ("NO" in step S30).

Subsequently, when the vehicle occupant P presses the table use button 70 again, table stowing signals are inputted to the control section 80 ("YES" in step S40 in FIG. 7). Note that FIG. 7 is omitted in the following descriptions).

When the table stowing signals are inputted, the control section 80 outputs stowing signals to the opening motors 60A and 60B (step S42). Accordingly, the opening motors 60A and 60B are driven and the table 56 is turned 90° in the counterclockwise direction of FIG. 3 (see arrow B2 in FIG. 3). As a result, the table 56 is arranged to extend in the vehicle vertical direction and made parallel with the pair of support rods 54A and 54B in the vehicle side view.

Next, the control section 80 outputs raising signals to the table raising and lowering motor 58 (step S44). Accordingly, the table raising and lowering motor 58 is driven and the pair of support rods 54A and 54B are turned 90° in the counter-clockwise direction of FIG. 3 (see arrow A2 in FIG. 3). As a result, as shown in FIG. 2, the pair of support rods 54A and 54B are arranged in a direction extending in the vehicle front-and-rear direction and are stowed in the recess portion 50 provided at the ceiling 24.

Then, unless the original position of the vehicle seat 16, that has been temporarily memorized in the table opening processing described above, is the rearmost end position, the control section 80 outputs advancing signals to the seat sliding motor 42 (step S46). Accordingly, the seat sliding motor 42 is driven and the vehicle seat 16 moves toward the vehicle front side on the seat rail lower members 38.

When the control section 80 confirms, on the basis of detection signals from the seat position detection sensor 44, that the vehicle seat 16 has reached the original position, the control section 80 outputs stopping signals to the seat sliding motor 42 ("YES" in step S48; step S50). Thus, as shown in FIG. 1, the vehicle seat 16 is moved on the seat rail lower members 38 to the original position at the vehicle front side.

Next, on the basis of detection signals from the lamp on/off detection sensor 82, the control section 80 makes a determination as to whether the spot lamp 64 is lit (step S52). If the control section 80 determines that the spot lamp 64 is lit ("YES" in step S52), the control section 80 extinguishes the spot lamp 64 (step S54).

Then, the control section 80 outputs running prohibition cancellation signals to the running control ECU 84 (step S54). As a result, the switching prohibition that prohibits switching to a driving mode other than a fully autonomous driving mode is cancelled. This prohibition cancellation completes the table stowing processing.

Thus, in the automobile 10 according to the present exemplary embodiment, the table 56 stowed at the ceiling 24 side is lowered and opened (installed) between the steering wheel 22 and the vehicle occupant P sitting on the driver seat consequent to the vehicle occupant P simply pressing the table use button 70. That is, the table 56 may be easily installed at the seat front of the vehicle occupant P, and the vehicle occupant P may place and read a book on the table 56 or place and consume food and drink.

In this situation, because the pair of support rods 54A and 54B supporting the table 56 are disposed at the vehicle front side of the table 56 in the open state, and are disposed at vehicle width direction outer sides relative to shoulder positions of the vehicle occupant P (see FIG. 4), interference between the support rods 54A and 54B and the hands or arms of the vehicle occupant moving over the table 56 is prevented, which is excellent for convenience.

Because the vehicle seat 16 moves to the rearmost end position when the table 56 is opening, a space for the table 56 to open into between the vehicle occupant P sitting on the vehicle seat 16 and the steering wheel 22 is reliably assured.

In particular, because the vehicle seat 16 is moved toward the rearmost end position before the support rods 54A and 54B turn, interference between the vehicle occupant P and the support rods 54A and 54B and table 56 that are turning 90° clockwise in the vehicle side view may be prevented.

Because the spot lamp 64 is disposed at the vehicle upper side of the open table 56, the open table 56 alone may be illuminated at night or the like. Therefore, it may both be made more difficult to see the vehicle cabin interior, particularly the vehicle occupant P and the like, from outside the vehicle and be made easier to read or the like.

When the table is stowed, the spot lamp 64 is covered by the table 56. Therefore, the spot lamp 64 is not visible to vehicle occupants in the vehicle cabin 12, which is excellent for visual design.

Because opening of the table 56 is restricted to times when the automobile 10 is halted or times of fully autonomous driving, the table 56 is reliably prevented from being disposed between the vehicle occupant P on the driver seat and the steering wheel 22 when there is a possibility of operation of the steering wheel 22.

Because the vehicle seat 16 automatically returns to the original position (a position for driving) when the table is stowed, operability of the steering wheel 22 after the table is stowed is excellent, in addition to which there is no need for the vehicle occupant P to manually return the vehicle seat 16 to the original position.

In the present exemplary embodiment, a structure in which stowing of the table 56 is started by a press of the table use button 70 is described. However, when change warning signals, that warn that a change from a fully autonomous driving mode to another driving mode is necessary, are inputted from the running control ECU 84 to the control section 80, the processing from step S24 onward may be executed and the table 56 is stowed in the recess portion 50 quickly. Consequently, when the driving mode of the automobile 10 is changed from a fully autonomous driving mode to another driving mode, the table 56 may be stowed quickly and obstruction of driving operations by the vehicle occupant P (operations of the steering wheel 22) may be prevented.

Variation

In the automobile 10 according to the first exemplary embodiment, the spot lamp 64 is lit by operation of the lamp lighting button 72. However, a configuration is possible in which the spot lamp 64 turns on automatically when the table is opened.

Figure 8:
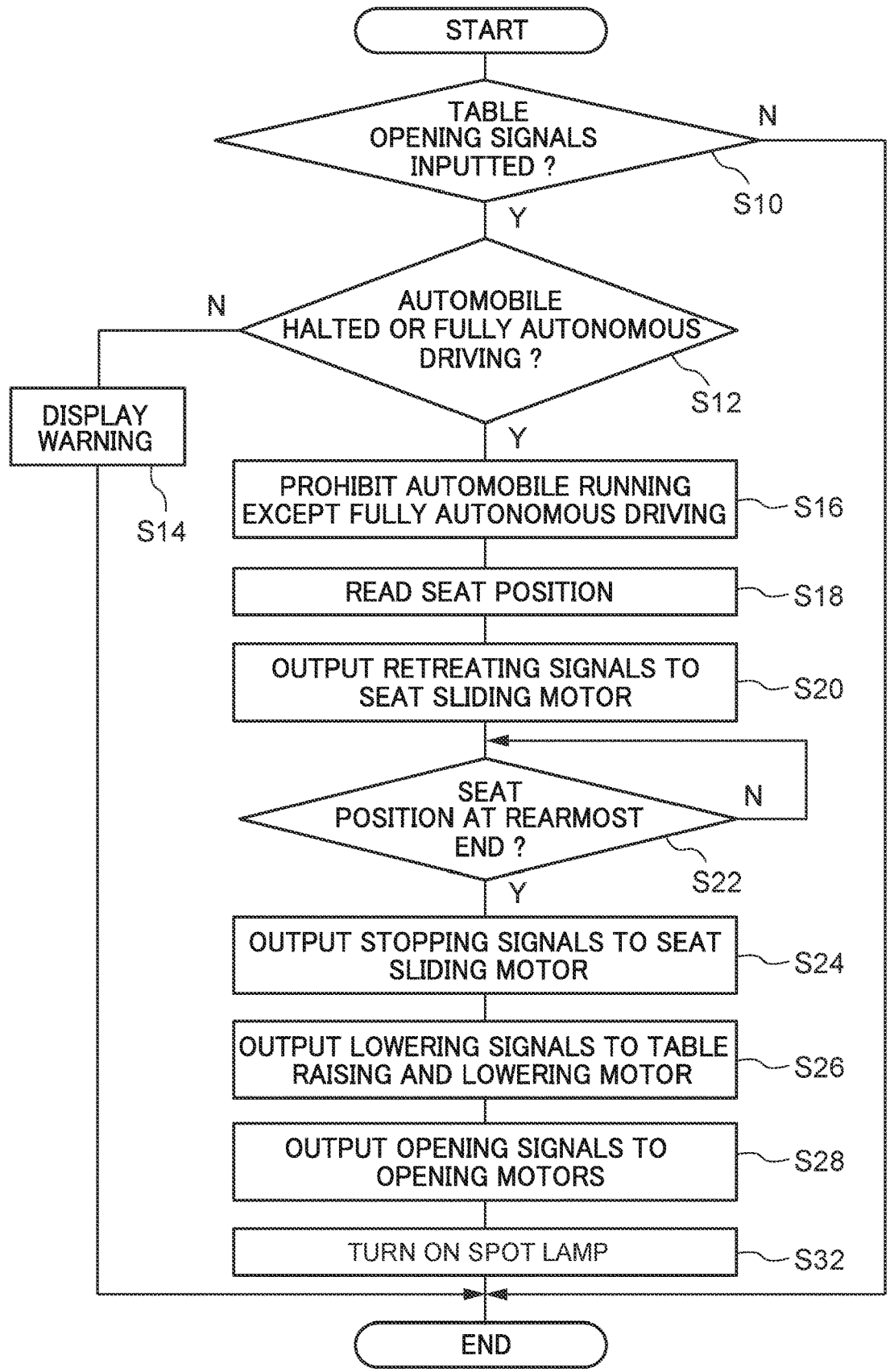
FIG. 8 is a flowchart showing a table opening procedure in an automobile according to a variation of the first exemplary embodiment.

That is, as shown in the flowchart in FIG. 8, after the opening signals have been outputted to the opening motors 60A and 60B and the table 56 has completed opening (step S28), the lighting signals are outputted from the control section 80 to the spot lamp 64 and the spot lamp 64 is lit (step S32).

Accordingly, the spot lamp 64 is always automatically lit when the table is opened, and no operation to turn on the spot lamp 64 is needed. Thus, convenience is improved. It may be that the lamp lighting button 72 is pressed to extinguish the spot lamp 64 when the spot lamp 64 is to be extinguished.

Second Exemplary Embodiment

An automobile according to a second exemplary embodiment of the present disclosure is described with reference to FIG. 9 to FIG. 13. The drawings are schematic drawings; parts that have little relationship with the present disclosure are not shown in the drawings. Structural elements that are similar to the first exemplary embodiment are assigned the same reference symbols and are not described in detail. The automobile differs from the automobile 10 only in the table opening apparatus, and only those portions are described in detail.

Structures

A table opening apparatus 102 of an automobile 100 is equipped with a stowage portion 104, driving rollers 106 and passive rollers 108, and endless belts 110. The stowage portion 104 extends to the vehicle rear side of the recess portion 50 in the ceiling 24, has a rectangular shape in side view, and is open at the vehicle front side thereof. The driving rollers 106 and passive rollers 108 are provided at each of two vehicle width direction end portions of the stowage portion 104. Each endless belt 110 is wound round the corresponding driving roller 106 and passive roller 108. Each driving roller 106 is driven to turn by a driving motor 111 provided at an end portion of the driving roller 106. The driving motor 111 corresponds to the table raising and lowering motor 58 according to the first exemplary embodiment.

A pair of support members 112A and 112B are stowed inside the stowage portion 104. Each support member 112A or 112B is formed such that a rod-shaped first support member 114, second support member 116 and third support member 118 are connected by hinges 120 and 122. More specifically, in a state in which each support member 112A or 112B is stowed in the stowage portion 104, a rear end of the first support member 114 is connected with a front end of the second support member 116 at the hinge 120 and a rear end of the second support member 116 is connected with a front end of the third support member 118 at the hinge 122.

Each of the pair of third support members 118 is coupled with the corresponding endless belt 110 by a coupling portion 124 at the vehicle rear side of the third support member 118. When the driving rollers 106 rotate, the pair of third support members 118, and thus the support members 112A and 112B, project out from the stowage portion 104 together with the endless belts 110, or are stowed from outside into the stowage portion 104.

Figure 9:
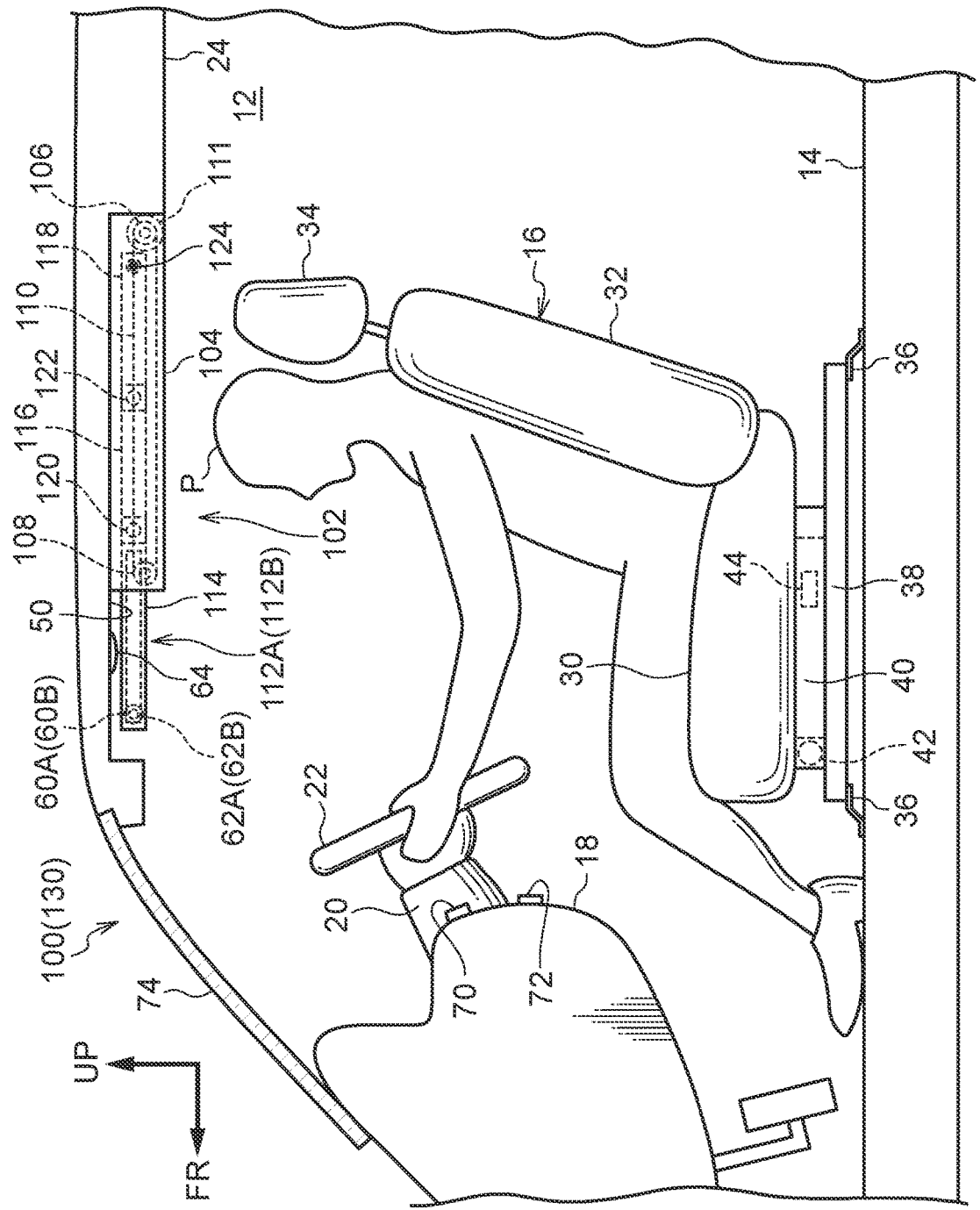
FIG. 9 is a side sectional diagram viewing a driver seat side in an automobile according to a second exemplary embodiment, in which the automobile is sectioned at the vehicle width direction middle, and the diagram showing a table stowed state.
Figure 10:
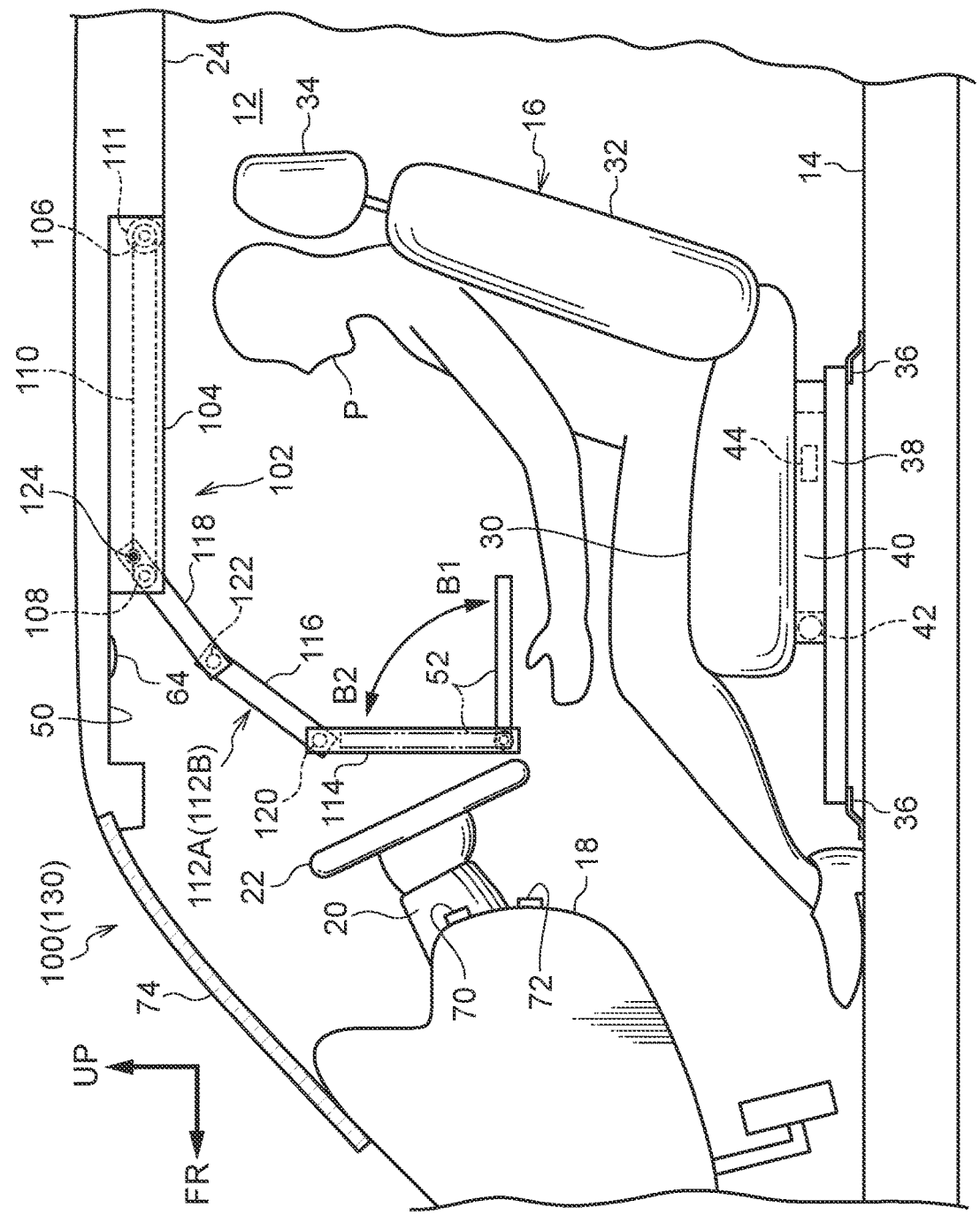
FIG. 10 is a side sectional diagram viewing the driver seat side in the automobile according to the second exemplary embodiment, in which the automobile is sectioned at the vehicle width direction middle, and the diagram showing a table open state.

As shown in FIG. 9, in the state in which the support members 112A and 112B are stowed in the stowage portion 104, the support members 112A and 112B are in linear shapes in the vehicle front-and-rear direction. As shown in FIG. 10, when the support members 112A and 112B project from the stowage portion 104, the hinges 120 and 122 are inflected and the support members 112A and 112B curve downward.

The table 56 is disposed between the pair of first support members 114. The table 56 is structured to be turnable through 90° about the rotary axles 62A and 62B by driving of the opening motors 60A and 60B.

Operation

In the automobile 100 structured as described above, opening processing for the table 56 is executed in a similar manner to the automobile 10 according to the first exemplary embodiment (see FIG. 6).

In the automobile 100, however, when opening signals are outputted from the control section 80 to the driving motor 111 corresponding to the table raising and lowering motor 58 (see step S26 in FIG. 6), each driving roller 106, passive roller 108 and endless belt 110 are turned counterclockwise in FIG. 9 by the driving of the driving motor 111. As a result, the pair of third support members 118 coupled with the endless belts 110, which is to say the support members 112A and 112B, are pushed out to the vehicle front side from the stowage portion 104, and the hinges 120 and 122 proceed to inflect (curve) downward in ranges in which turning thereof is allowed. Hence, as shown in FIG. 10, the first support members 114 disposed at the far distal end are disposed furthest to the vehicle front side and furthest to the vehicle lower side, and the first support members 114 are disposed to extend in the vehicle vertical direction.

In this state, driving signals are outputted from the control section 80 to the opening motors 60A and 60B (see step S28 in FIG. 6). Accordingly, the table 56 turns 90° in the direction of arrow B1, about a turning axis thereof at distal end portions of the first support members 114 extending in the vehicle vertical direction, and is arranged in the horizontal direction (is opened).

Subsequently, in stowing processing to stow the table 56 (and the support members 112A and 112B) in the stowage portion 104, driving signals are outputted from the control section 80 to the opening motors 60A and 60B (see step S42 in FIG. 7). Accordingly, the table 56 turns 90° counterclockwise and is made parallel with the first support members 114 (the table 56 is accommodated between the pair of first support members 114). In this state, driving signals are inputted to the driving motor 111, and each driving roller 106, passive roller 108 and endless belt 110 are turned clockwise (see step S44 in FIG. 7). Accordingly, the third support member 118 coupled with the endless belt 110 by the coupling portion 124 is pulled into the stowage portion 104, and the second support member 116 and first support member 114 coupled with the third support member 118 are successively stowed in the stowage portion 104.

Thus, the automobile 100 too provides similar operational effects to the automobile 10 according to the first exemplary embodiment.

In addition, at each of the support members 112A and 112B of the automobile 100, the rod-shaped first support member 114, second support member 116 and third support member 118 are coupled by the hinges 120 and 122. When the table 56 is being opened, the first support member 114, second support member 116 and third support member 118 successively inflect downward while emerging from the stowage portion 104. Therefore, as depicted in FIG. 10, there is little risk of the support members 112A and 112B (and the table 56) interfering with the vehicle occupant P sitting on the driver seat, and operability is excellent.

First Variation

An automobile 130 according to a first variation of the second exemplary embodiment is described with reference to FIG. 11 and FIG. 12. All structures of the automobile 130 are the same as in the automobile 100 shown in FIG. 9 and FIG. 10. The automobile 130 differs from the automobile 100 only in that the vehicle seat 16 is not moved in the vehicle front-and-rear direction when the table is opened and when the table is stowed.

Figure 11:
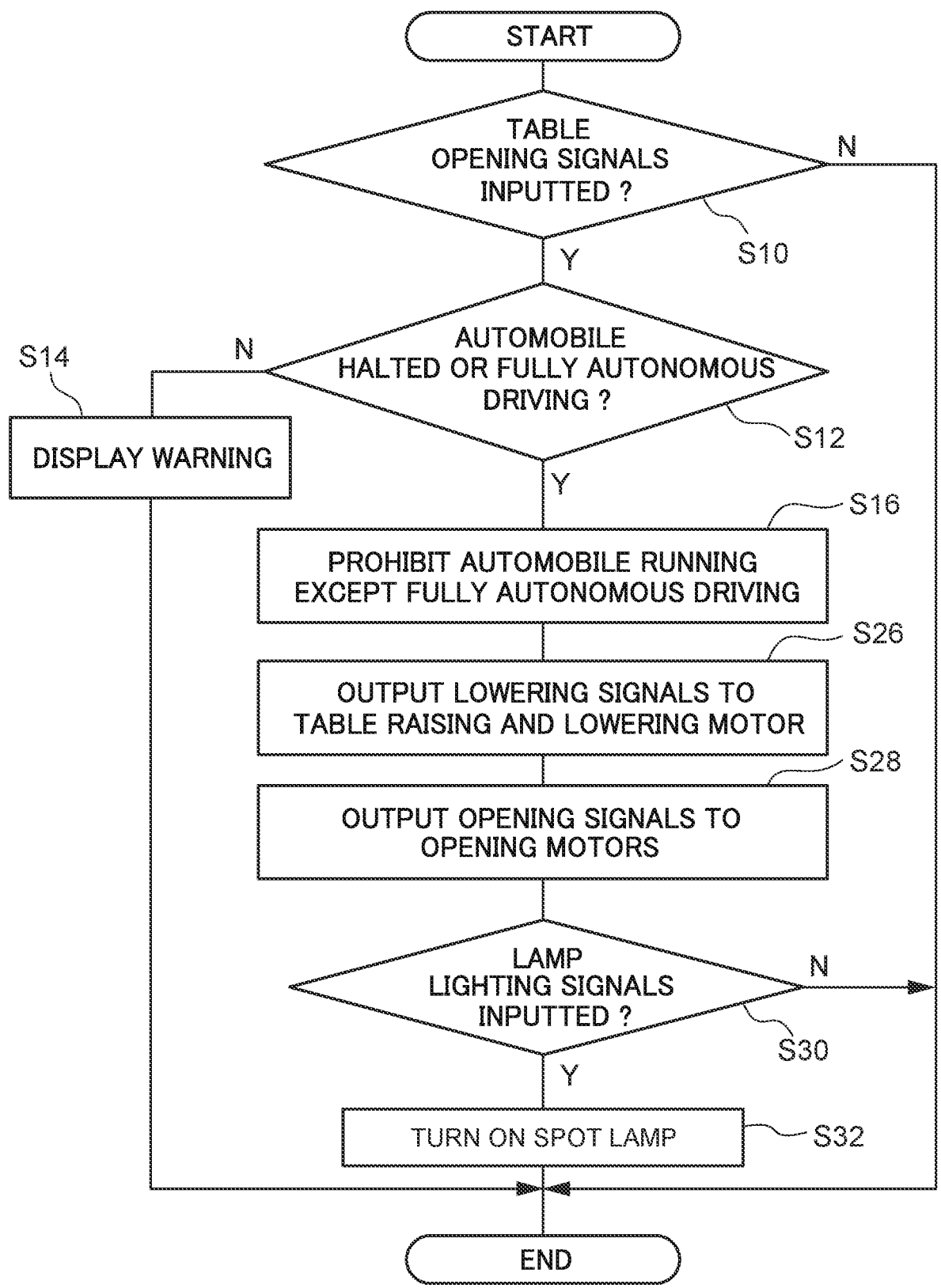
FIG. 11 is a flowchart showing a table opening procedure in an automobile according to a first variation of the second exemplary embodiment.

That is, as shown in FIG. 11, when the table is opened in the automobile 130, the control section 80 outputs switch prohibition signals, which prohibit switching into a driving mode other than a fully autonomous driving mode, to the running control ECU 84 (step S16). Directly thereafter, the control section 80 outputs driving signals to the driving motor 111, and the support members 112A and 112B are pulled out from the stowage portion 104 (step S26). Subsequently, the table 56 is opened by opening signals being inputted to the opening motors 60A and 60B (step S28).

Figure 12:
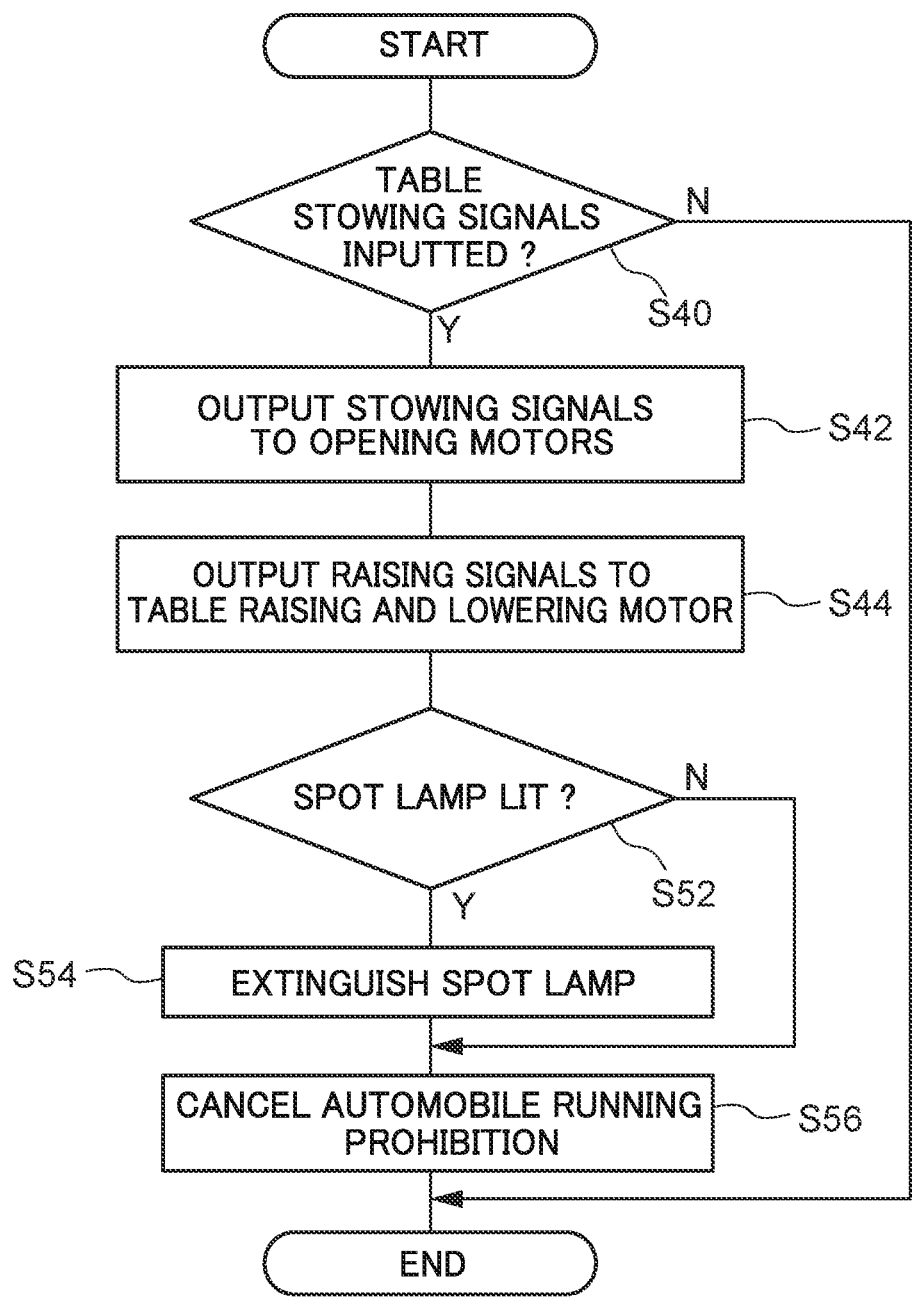
FIG. 12 is a flowchart showing a table stowing procedure in the automobile according to the first variation of the second exemplary embodiment.

As shown in FIG. 12, when the table is stowed in the automobile 130, the control section 80 outputs raising signals to the driving motor 111, the support member 112A and 112B are stowed into the stowage portion 104 (step S44), and the control section 80 makes a determination as to whether the spot lamp 64 is lit (step S52).

Thus, when the table is opened in the automobile 130, the first support members 114, second support members 116 and third support members 118 of the support members 112A and 112B are successively inflected downward while emerging from the stowage portion 104. Therefore, the table 56 may be opened to between the vehicle occupant P sitting on the vehicle seat 16 and the steering wheel 22 during operation of the steering wheel.

Therefore, because front and rear movements of the vehicle seat 16 are omitted when the table is being opened in the automobile 130 and when the table is being stowed, control is simplified and processing durations when the table is being opened and when the table is being stowed are shortened. This, a duration required to return from a table usage state to a driving operation state may be shortened.

Second Variation

An automobile 140 according to a second variation of the second exemplary embodiment is described with reference to FIG. 13. The automobile 140 (and a table opening apparatus 141 thereof) is structured to enable manual opening and stowing of the table 56. Only differences from the automobile 100 are described here; other descriptions are not given.

As shown in FIG. 13, a projection portion 142 is formed at the table opening apparatus 141. The projection portion 142 projects to the vehicle front side from a vehicle front end portion of the stowage portion 104. An anchoring member 144 with a substantially triangular shape is disposed at the projection portion 142. The anchoring member 144 is turnable clockwise or counterclockwise in the vehicle side view. The anchoring member 144 is urged clockwise at usual times by an urging member, which is not shown in the drawings.

A notch 146 that is substantially triangular in the vehicle side view is formed in a lower face of each first support member 114 at the side thereof that is coupled to the second support member 116. The notch 146 includes an anchoring face 148 at the vehicle rear side thereof and a guide face 150 at the vehicle front side. In the vehicle side view, the anchoring face 148 has a larger inclination angle and the guide face 150 has a smaller inclination angle relative to the vehicle front-and-rear direction.

When the table is being stowed, which is to say when the support member 112A or 112B is being stowed into the stowage portion 104, the anchoring member 144 enters into the notch 146 and the anchoring member 144 that is being urged clockwise in the vehicle side view is pressed against the anchoring face 148 of the notch 146. Thus, the support member 112A or 112B is prevented from falling from the stowage portion 104.

A guide cord 152 is attached to a distal end of the support member 112A or 112B.

The table 56 is turnably supported at rotary axles 154A and 154B at the distal end sides of the first support members 114.

Thus, when the table is being opened, the anchoring member 144 is turned counterclockwise in opposition to the urging force of the anchoring member 144 by the vehicle occupant P pulling on the guide cord 152, and the anchoring member 144 is pushed out from the notch 146. Hence, the support members 112A and 112B are pulled out from the stowage portion 104 and lowered while inflecting (curving) downward. When the support members 112A and 112B descend to a lower end, the table 56 is put into the table open state by being turned 90° from between the first support members 114.

When the table is being stowed, the support members 112A and 112B are inserted into the stowage portion 104 by operations opposite to the operations at the time of table opening, and the anchoring member 144 enters into the notch 146. The support members 112A and 112B (and the table 56) are prevented from falling from the stowage portion 104 by the anchoring member 144 that is urged clockwise in the vehicle side view pressing against the anchoring face 148 of the notch 146.

Thus, the table 56 may be opened and stowed manually.

Alternatives

In this set of exemplary embodiments, cases in which the vehicle seat 16 is a driver seat are described, but the exemplary embodiments are applicable to a front passenger seat or the like. For example, if the vehicle seat 16 is a front passenger seat, then because the steering column 20, steering wheel 22 and the like are absent, there is a large space between the dashboard 18 and a seated vehicle occupant. Therefore, control to move the vehicle seat 16 to the rearmost end may be omitted, as in the first variation of the second exemplary embodiment. In other words, the table 56 may be opened and stowed without the vehicle seat 16 being moved.

Further in this set of exemplary embodiments, two types of automatic structure and one type of manual structure for raising and lowering the table 56 are recited, but this is not limiting. This structure (apparatus) is not particularly limited provided it is configured to raise and lower the table 56 between the side of the vehicle cabin 12 at which the ceiling 24 is disposed and the vehicle front of a seated vehicle occupant P on the vehicle seat 16 without interfering with the vehicle occupant P, the steering wheel 22, the dashboard 18 and the like.

In this set of exemplary embodiments, cases are described in which the seat front of the vehicle seat 16 matches the vehicle front, but the exemplary embodiments are also applicable to cases in which the seat front differs from the vehicle front. For example, the exemplary embodiments may be applied to cases in which the vehicle seat 16 is oriented toward the vehicle rear side.

In this set of exemplary embodiments, the vehicle seat 16 is moved to the rearmost end position when the table is being opened, but any structure in which the vehicle seat 16 is moved toward the vehicle rear side may be acceptable.

What is claimed is:

1. An automobile, comprising:
a table stowed at and coupled to a ceiling of a vehicle cabin; and
a table raising and lowering apparatus configured to, resulting from a predetermined operation, raise and lower the table between a usage position at a seat front side of a vehicle occupant seated on a vehicle seat and a stowage position at which the table is stowed at the ceiling.

2. The automobile according to claim 1, further comprising an operation apparatus that causes driving of the table raising and lowering apparatus,
wherein the table raising and lowering apparatus is configured to be driven and the table is raised or lowered in response to the operation apparatus being operated.

3. The automobile according to claim 2, further comprising a seat movement apparatus that moves the vehicle seat in a seat front-rear direction,
wherein, in response to the operation apparatus being operated, the seat movement apparatus is configured to move the vehicle seat toward a seat rear before the table raising and lowering apparatus lowers the table from the stowage position to the usage position.

4. The automobile according to claim 3 wherein, in response to the table raising and lowering apparatus raising the table from the usage position to the stowage position, the seat movement apparatus is configured to move the vehicle seat to an original position at a seat front side, the original position being a position of the vehicle seat prior to the operation of the operation apparatus for lowering of the table.

5. The automobile according to claim 1, wherein the vehicle seat is a driver seat.

6. The automobile according to claim 5, wherein:
the automobile is capable of autonomous driving; and
the table can be lowered from the stowage position to the usage position only when the automobile is halted or during fully autonomous driving.

7. The automobile according to claim 5, wherein:
the automobile is capable of autonomous driving; and
when the table is at the usage position, switching to a driving mode other than a fully autonomous driving mode is prohibited.

8. The automobile according to claim 1, wherein a spot lamp configured to illuminate the table, when the table is at the usage position, is provided at the ceiling, the spot lamp being disposed at a vehicle upper side of the table when the table is at the stowage position.

9. The automobile according to claim 8, wherein the spot lamp automatically turns on when the table is lowered by the table raising and lowering apparatus.

10. An automobile, comprising:
a table stowed at a ceiling of a vehicle cabin;
a table raising and lowering apparatus configured to, resulting from a predetermined operation, raise and lower the table between a usage position at a seat front side of a vehicle occupant seated on a vehicle seat and a stowage position at which the table is stowed at the ceiling;

an operation apparatus that causes driving of the table raising and lowering apparatus; and a seat movement apparatus that moves the vehicle seat in a seat front-rear direction, wherein the table raising and lowering apparatus is configured to be driven and the table is raised or lowered in response to the operation apparatus being operated, wherein, in response to the operation apparatus being operated, the seat movement apparatus is configured to move the vehicle seat toward a seat rear before the table raising and lowering apparatus lowers the table from the stowage position to the usage position.

11. The automobile according to claim 10, wherein, in response to the table raising and lowering apparatus raising the table from the usage position to the stowage position, the seat movement apparatus is configured to move the vehicle seat to an original position at a seat front side, the original position being a position of the vehicle seat prior to the operation of the operation apparatus for lowering of the table.

12. The automobile according to claim 10, wherein the vehicle seat is a driver seat.

13. The automobile according to claim 10, wherein:
the automobile is capable of autonomous driving; and
the table can be lowered from the stowage position to the usage position only when the automobile is halted or during fully autonomous driving.

14. The automobile according to claim 10, wherein:
the automobile is capable of autonomous driving; and
when the table is at the usage position, switching to a driving mode other than a fully autonomous driving mode is prohibited.

15. The automobile according to claim 10, wherein a spot lamp configured to illuminate the table, when the table is at the usage position, is provided at the ceiling, the spot lamp being disposed at a vehicle upper side of the table when the table is at the stowage position.

16. An automobile, comprising:
a table stowed at a ceiling of a vehicle cabin;
a table raising and lowering apparatus configured to, resulting from a predetermined operation, raise and lower the table between a usage position at a seat front side of a vehicle occupant seated on a vehicle seat and a stowage position at which the table is stowed at the ceiling; and
a seat movement apparatus that moves the vehicle seat in a seat front-rear direction, wherein:
the automobile is capable of autonomous driving; and
the table can be lowered from the stowage position to the usage position only when the automobile is halted or during fully autonomous driving.

17. The automobile according to claim 16, further comprising an operation apparatus that causes driving of the table raising and lowering apparatus,
wherein the table raising and lowering apparatus is configured to be driven and the table is raised or lowered in response to the operation apparatus being operated.

18. The automobile according to claim 16 wherein, in response to the table raising and lowering apparatus raising the table from the usage position to the stowage position, the seat movement apparatus is configured to move the vehicle seat to an original position at a seat front side, the original position being a position of the vehicle seat prior to the operation of the operation apparatus for lowering of the table.

19. The automobile according to claim 16, wherein the vehicle seat is a driver seat.

20. The automobile according to claim 16, wherein a spot lamp configured to illuminate the table, when the table is at the usage position, is provided at the ceiling, the spot lamp being disposed at a vehicle upper side of the table when the table is at the stowage position.

* * * * *